Oct. 13, 1942.   S. D. TAYLOR ET AL   2,298,986
CUSHIONING MATERIAL OF SPONGELIKE OR CELLULAR RUBBER
Filed Jan. 28, 1941
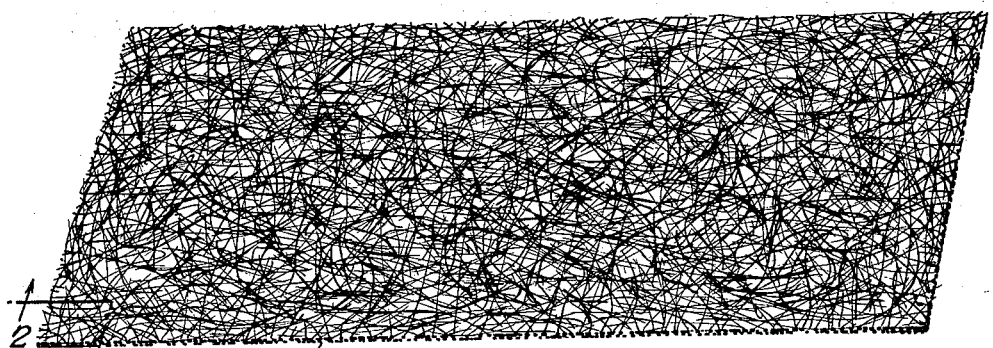
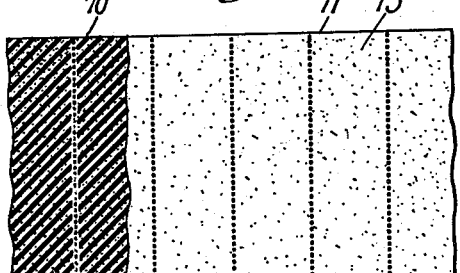
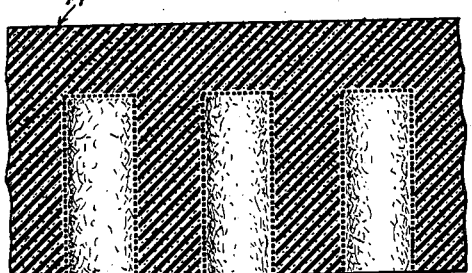
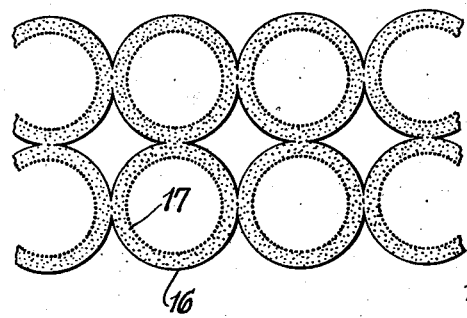
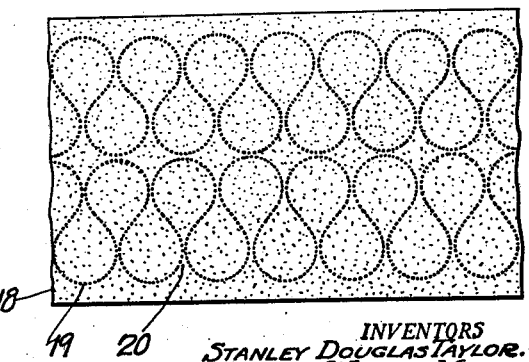
INVENTORS
STANLEY DOUGLAS TAYLOR.
EVELYYN WILLIAM MADGE.
BY EDWARD ARTHUR MURPHY.
Benj. T. Rauber
their ATTORNEY Patented Oct. 13, 1942

2,298,986

UNITED STATES PATENT OFFICE 2,298,986

CUSHIONING MATERIAL OF SPONGELIKE OR CELLULAR RUBBER

Stanley Douglas Taylor and Evelyn William Madge, Sutton Coldfield, and Edward Arthur Murphy, Wylde Green, England, assignors to Dunlop Rubber Company Limited, London County, England, a British company Application January 28, 1941, Serial No. 376,272 In Great Britain February 7, 1940

12 Claims. (Cl. 18—59)

This invention relates to cushioning material of sponge-like or cellular rubber.

It has already been proposed to provide the walls of the cavities in a sponge rubber structure with strengthening members of fabric or of animal, vegetable or mineral fibres. It is also disclosed that a fabric can be located across the walls of the cavities, passing through the walls themselves and that portions of said fabric insertion within the cavities can be provided with openings.

The object of the present invention is to produce cavitied or non-cavitied cushioning material of sponge-like or cellular rubber having for a given load carrying capacity a smaller bulk density than heretofore.

According to the present invention cushioning material comprises a body of sponge-like or cellular rubber obtained directly from an aqueous rubber dispersion, having therein column-like structures of thin material of open network made by compacting into sheet form loosely intermingled springy upholstery fibres treated with a resilient adhesive.

In accordance with the invention the said cushioning material can have therein, in the direction of the normal load, column-like structures of tubular, helical or strip construction formed from the said material of open network.

The upholstery fibres should be sufficiently springy that they readily yield under a load but tend to recover their original configuration on the removal of the load. Examples of suitable fibres are horsehair, pighair, sisal, mineral fibres like glass wool; the flexible artificial fibres of viscose and other kinds of cellulose or of artificial resins.

The resilient adhesive used is preferably an aqueous dispersion of rubber or the like occurring naturally or artificially obtained, and in vulcanised or unvulcanised condition. Aqueous dispersions of coagulated rubber, vulcanised rubber, synthetic rubber, waste rubber or reclaimed rubber may also be employed, if desired, as alternatives or admixtures. Any of the aforesaid dispersions may contain the usual known compounding ingredients. Concentrates obtained by the methods described in Patent No. 1,846,164 and Serial No. 727,530 of July 22, 1924, to which may be added any one or more of the usual compounding ingredients, may also be used. The resilient adhesive, however, can also be a rubber cement, a cellulose derivative or a flexible glue.

The thin material of open network is conveniently prepared in the following manner. Upholstery fibre such as pighair, is teased out in laminar form and sprayed with a vulcanisable latex composition. The composition is allowed to dry at room temperature; the drying is complete in a few minutes. The sheet so obtained is compacted by passing it several times through a calender, the nip of which is reduced after each pass of the sheet therethrough.

Suitable tubes may be prepared from the sheet by rolling it round a tube of suitable diameter and cutting the cylinders so obtained into the lengths required. Alternatively, the sheet may be wound spirally and then cut to the desired lengths. For making tubes of polygonal cross-section, rods having the desired cross-section are employed.

The vulcanisation of rubber in the material so obtained may be effected before or after the incorporation of the material in the body of sponge rubber.

The material of open network is light, cheap, springy in the direction in which the load is applied, and does not corrode, and the resilient adhesive causes the fibres to retain their resiliency substantially undiminished in use. It is preferable to employ the agglutinated fibres in tubular form as by this simple construction a high resistance to deflection under load can be obtained with a minimum amount of fibres.

In accordance with one embodiment of the invention sponge-like or cellular rubber upholstery having cavities on the side forming the base has the said cavities lined with the material of open network. The cavities may be lined either during or after their formation. The lining preferably reaches to the base of the upholstery unit.

The tubes of rubbered fibre may be attached to the rubber upholstery by means of self-vulcanising rubber solution or by a self-vulcanising latex mixing. The tubes may be treated all over with adhesive so that they are uniformly attached or they may be attached locally, or they need not be attached at all, but kept in place by, for example, a piece of fabric attached to the base of the sponge rubber.

In lining the cavities during the formation of the cavitied sponge-like or cellular rubber directly from aqueous rubber compositions the tubes of rubbered fibre are slipped over the cavity-forming projections on the inner side of the mould lid. Moulding is then carried out in the normal manner. The mould projections may be specially grooved to facilitate the holding of the tubes. The rubber of the rubbered fibre is preferably vulcanised during the subsequent step of vulcanising the sponge-like or cellular rubber.

Alternatively, the cavities can be formed without using mould lids with projections. The tubes of rubbered fibre are closed at one end, temporarily mounted and spaced on a frame or mould cover, inserted into latex foam contained in a mould and the foam allowed to set.

A non-cavitied block of latex sponge rubber having tubes of rubbered fibre embedded therein can be made as follows. The tubes are first of all attached to one another (the rubber on the tubes being still in the tacky condition) to form a honeycomb structure and are then introduced into a mould containing sufficient latex foam to fill the mould completely on the introduction of the honeycomb structure. The foam rises up through the structure, completely submerging it. The position of the honeycomb structure and the amount of foam should be arranged so that there is a free layer of froth above the reinforced structure. The foam is then caused or allowed to set.

If desired, in order to improve ease of manipulation, the tubes of rubbered fibre can first be provided with a coating of sponge rubber from a latex foam or such sponge-coated tubes can be made from strips of rubbered fibre provided with a layer of sponge rubber from a latex foam.

Helically constructed columns of rubbered fibre of open network can be made in the following manner. A strip of rubbered fibre is wound spirally on to a cylinder and is vulcanised so as to fix the strip in the spiral form. The spiral is stripped off the cylinder and subsequently placed in foamed latex which is then set. The strip of rubbered fibre may alternatively be wound spirally on the cavity-forming projections of a mould for moulding sponge rubber articles, in order that the final latex sponge rubber product, after vulcanisation, shall possess cavities lined with spirals of rubbered fibre.

Various features of the invention are illustrated, by way of example, in the accompanying drawing in which Fig. 1 is a perspective view of a sheet of the compacted loosely intermingled springy fibers treated with a resilient adhesive. Fig. 2 is a section taken on the line 2—2 on a greatly magnified scale. Fig. 3 is a vertical elevation, partly in section, of molded sponge rubber having the structure of Fig. 1 embedded therein. Fig. 4 is a vertical section of a molded sponge rubber cushion having hollow tubes embedded in cavities therein. Fig. 5 is a sponge rubber structure made of tubes of sponge rubber lined with the compacted loosely intermingled fibers, and Fig. 6 is a section of molded sponge rubber having a continuous honeycomb structure of the compacted loosely intermingled fibers embedded therein.

In the sheet of compacted loosely intermingled fibers of Figs. 1 and 2, the individual fibers 7 are coated with a layer 8 of rubber, or similar resilient adhesive, and thereby reinforced, and are cemented together at their points of contact by the resilient covering as illustrated, for example, at 9 in Fig. 2. The coating and embedding of the fibers with the resilient adhesive firmly unites them together into a structure that has increased resistance to distortion, particularly in the plane of the sheet but which, because of the resilient qualities of this cementing material, may be distorted temporarily by stresses and will return to its original position when the stress is removed.

In the structure shown in Fig. 3 the sheet material 10 is embedded at right angles to the upper and lower faces 11 and 12 of a mass of foamed latex rubber 13. In this way the foamed latex is reinforced in a direction of the normal load which will be applied to one or the other of the faces 11 or 12.

In the construction shown in Fig. 4 a molded mass 14 of sponge rubber has recesses extending upwardly at spaced intervals from its lower surface and the cushion is reinforced by hollow tubes 15 of the sheet of compacted loosely intermingled fibers cemented with the resilient adhesive.

In the structure of Fig. 5 hollow tubes 16 of foamed latex surround and embed tubular structures 17 of the compacted loosely intermingled and cements fibers, and the tubes 16 contact with each other to form a hollow or honeycomb structure.

In the construction of Fig. 6 a molded mass 18 of foamed latex rubber has embedded therein a honeycomb type of structure formed by bending the sheet 19 of the compacted loosely intermingled cement fibers until adjacent walls of the honeycomb structure contact as at 20 thus reinforcing the block of cellular rubber particularly against stresses applied at right angles to the plane of the figure or lengthwise of the walls of the sheet 19.

It will be understood that these are but a few of the many forms which the sheet may take in combination with the foamed latex rubber structures in which it is embedded, and that when embedded, it reinforces the foamed rubber. Not only does the structure thus obtained enable a desired stiffness to be imparted with a lower density of the foamed latex than would otherwise be possible, but it enables the foamed latex structure to be reinforced at selected areas or parts of the molded structure.

What we claim is:

1. Cushioning material comprising a body of cellular rubber and hollow columns of thin open network therein and comprising compacted sheets of loosely intermingled spring fibers and a resilient adhesive.

2. Cushioning material comprising a body of foamed latex rubber and hollow columns of thin open network in said body and comprising compacted sheets of loosely intermingled upholstery fibers coated with a resilient adhesive.

3. The cushioning material of claim 2 in which the resilient adhesive is rubber.

4. Cushioning material comprising a body of cellular rubber foam and tubular columns therein of loosely intermingled upholstery fibers cemented together with a resilient adhesive.

5. Cushioning material comprising a body of cellular rubber foam and having cavities therein extending in the direction of the normal load of said cushioning material and hollow columns lining said cavities, said columns comprising loosely intermingled springy fibers cemented with a resilient adhesive.

6. The structure of claim 5 in which said columns are adhesively connected to the rubber foam.

7. Cushioning material which comprises a body of cellular rubber foam and a honeycomb structure in said body of cellular rubber foam, said honeycomb structure comprising hollow structures of compacted loosely intermingled springy fibers cemented with a resilient adhesive and with contacting walls.

8. A method of making a cushioning material which comprises forming tubular structures of loosely intermingled springy fibers, treating said fibers with a resilient adhesive, placing said tubular structures side by side to form a honeycomb structure, embedding said structure in a foamed aqueous dispersion of rubber material and setting the resulting foamed structure.

9. A method of forming a cushioning material which comprises forming tubes of loosely intermingled springy fibers, treating said fibers with a resilient adhesive, placing said tubes in spaced relation and embedding said tubes in a body of cellular rubber foam.

10. A method of making cushioning material which comprises forming openings in a body of cellular rubber foam and inserting into said openings columns of loosely intermingled fibers cemented to each other with a resilient adhesive.

11. A method of forming cushioning material which comprises enclosing multiple projections with loosely intermingled springy fibers cemented together with a resilient adhesive, embedding said covered projections in a mass of foamed aqueous dispersion of rubber composition and setting and vulcanizing the foamed dispersion.

12. Cushioning material comprising a body of sponge-like or cellular rubber obtained directly from an aqueous dispersion, said body having therein in the direction of the normal load column-like structures of thin material of open network of a compacted sheet of loosely intermingled springy upholstery fibers treated with a resilient adhesive.

STANLEY DOUGLAS TAYLOR.
EVELYN WILLIAM MADGE.
EDWARD ARTHUR MURPHY.